United States Patent

Lynch

Patent Number: 5,900,018
Date of Patent: May 4, 1999

[54] PROCESSOR-IMPLEMENTED METHOD OF CONTROLLING DATA ACCESS TO SHARED RESOURCE VIA EXCLUSIVE ACCESS CONTROL WRITE-CACHE

[75] Inventor: William L. Lynch, La Honda, Calif.

[73] Assignee: Sun Microsystems, Inc., Palo Alto, Calif.

[21] Appl. No.: 08/881,743

[22] Filed: Jun. 24, 1997

[51] Int. Cl.$^6$ .............................. G06F 9/46; G06F 12/00
[52] U.S. Cl. ........................ 711/147; 711/130; 395/726; 395/200.43
[58] Field of Search .................................. 711/130, 148, 711/155, 122, 147, 141, 142, 143, 145, 146; 395/379, 392, 394, 726, 728, 200.43

[56] References Cited

U.S. PATENT DOCUMENTS

| | | | |
|---|---|---|---|
| 4,414,624 | 11/1983 | Summer, Jr. et al. | 395/800.21 |
| 4,426,681 | 1/1984 | Bacot et al. | 711/130 |
| 4,445,174 | 4/1984 | Fletcher | 711/121 |
| 4,604,694 | 8/1986 | Hough | 395/726 |
| 5,175,829 | 12/1992 | Stumpf et al. | 395/379 |
| 5,251,308 | 10/1993 | Frank et al. | 711/163 |
| 5,317,749 | 5/1994 | Dahlen | 395/726 |
| 5,377,324 | 12/1994 | Kabemoto et al. | 711/148 |
| 5,394,551 | 2/1995 | Holt et al. | 395/726 |
| 5,428,761 | 6/1995 | Herlihy et al. | 711/130 |
| 5,511,175 | 4/1996 | Favor et al. | 395/392 |
| 5,535,365 | 7/1996 | Barriuso et al. | 395/726 |
| 5,579,505 | 11/1996 | Ohkami | 711/155 |
| 5,644,752 | 7/1997 | Cohen et al. | 711/122 |
| 5,649,102 | 7/1997 | Yamauchi et al. | 395/200.43 |
| 5,666,546 | 9/1997 | Donnan | 711/145 |
| 5,748,937 | 5/1998 | Abramson et al. | 395/394 |
| 5,774,731 | 6/1998 | Higuchi et al. | 395/726 |

Primary Examiner—Krisna Lim
Attorney, Agent, or Firm—Jones, Volentine, Steinberg & Whitt, L.L.P.

[57] ABSTRACT

An atomic instruction is executed without the use of a dedicated atomic unit. A store instruction is transmitted from a front-end of one of a plurality of processors to a write-cache to cause the write-cache to obtain exclusive access to a control memory of a shared resource. A first signal is then transmitted to the front end of the processor indicating that the write-cache has obtained exclusive access to the control memory of the shared source. At least one next instruction is executed, and a second signal is transmitted from the front end to the write cache indicating that execution of the at least one next instruction has been completed. Data from the write cache is stored in the control memory of the shared resource in response to the second signal transmitted to the write cache.

12 Claims, 3 Drawing Sheets

PROCESSOR-IMPLEMENTED METHOD OF CONTROLLING DATA ACCESS TO SHARED RESOURCE VIA EXCLUSIVE ACCESS CONTROL WRITE-CACHE

BACKGROUND OF THE INVENTION

1. Field of the Invention

The present invention generally relates to microprocessors, and in particular, the present invention relates to the execution of so-called "atomic" instructions in multiprocessor and/or multitasking machines. In the invention, atomics are implemented with a series of instructions which maximally use the existing hardware of the machine and require very little extra logic.

2. Description of the Related Art

In processor architectures and related technologies, an "atomic" instruction is a processor instruction that appears to be indivisible to other processors, and thus is performed in its entirety without interruption by other activities in the processor system. Atomics are primarily used in multiprocessor and multi-tasking machine environments.

An atomic instruction is characterized by the two or three parts thereof. That is, while there are multiple kinds of atomics, they basically all execute two or three operations, i.e., all atomics have a load and a store, and some atomics also have a compare that conditionalizes the store.

For example, consider the exemplary case shown in FIG. 1 where multiple processors 102, 104 and 106 all look to the same centralized memory location 108 for a shared or global resource 110. Access to the resource 110 is controlled by use of atomics to execute a so-called "compare and swap". Each processor is assigned a unique identifier number. In the instance where one processor wants access to the global resource 110, which only one of the processors is permitted to have at once, the software will execute a compare and swap on the memory location 112 that controls that resource 110.

That is, the number contained in the memory location 112 is loaded, and the loaded number is checked to see if its a zero. If it is not zero, then access to the resource 110 is denied. If it is zero, the identifier number of the processor seeking the resource 100 is stored in the memory location 112. In this example, no processor has an identifier number of zero. When the processor no longer needs the resource 110, zero is again stored in the memory location 112 to allow access by other processors.

It is therefore important that a processor be able to load the old number appearing in the memory location, check it to see if its zero, and if it is zero, finish the store of its own number before any other processor might load that same zero. Atomic processing achieves this by treating the load, compare and store functions as a single indivisible instruction. In this case, only the one processor can see the old load data before the completion of the store.

It should be noted that the "load, compare, store" atomic only appears to be indivisible, and that typically the processor instruction set does not actually support such a multiple function instruction in a single operation. Rather, the multiprocessor system has a special and dedicated mechanism in place to ensure that while one process is executing an atomic instruction, no other process can manipulate any objects accessed within the instruction.

Once a processor has gained control of the shared object (e.g., by loading its identifier number in the corresponding memory location), normal cache coherency protocols take effect. An atomic has store semantics which inform all other cache memories to invalidate their own copy of the shared object upon the store of the processor gaining control. This ensures that only one valid copy of the resource exists. While one processor has taken exclusive control of the shared object, the processes of that one processor appear atomic to the other processors with respect to that object.

The "compare and swap" atomic is implemented by the provision of special hardware within the machine, i.e., the dedicated atomic unit 114 of the machine as shown in FIG. 1. The atomic unit 114 effectively takes control of the entire system by seizing the memory line and sequencing through a load, a compare, and then a store. Typically, the atomic unit 114 takes charge of a data cache for doing the load part of an atomic, and it takes charge of a store queue for doing the store part of the atomic. Also, the atomic unit 114 is frequently equipped with its own comparator for the compare part of the atomic. The atomic unit 114 thus contains state machines that take control of the existing data cache and the existing store queue, and generally it has its own compare circuitry.

There are inherent drawbacks to the conventional implementation of atomics. For example, it is necessary to specially equip the machine with the seperate atomic unit, with the resulting hardware and space requirements associated therewith. Perhaps more importantly, however, is the disruption in the normal processings cause by the actions of the dedicated atomic unit. That is, to implement the atomic "compare and swap", the atomic part must cause the processor to cease normal operations pending completion of the atomic. This creates the dual disadvantages of slowing processing speeds and executing extra control logic which is often difficult to debug. In fact, debug problems are a significant problem associated with the current implementation of atomics.

SUMMARY OF THE INVENTION

It is an object of the present invention to overcome or at least minimize the disadvantages associated with the conventional implementation of atomics as discussed above.

It is a further object of the present invention to implement atomics without the use of a separate and dedicated atomic unit that takes charge of the machine each time an atomic is executed.

It is still a further object of the present invention to implement atomics without slowing the processing speeds of the normal units and without introducing an excessive amount of extra logic.

In one aspect of the invention, a processor-implemented method is provided for executing an atomic instruction in a multiprocessor system having a plurality of processors accessing a shared resource. The method includes transferring a store instruction from a front-end of one of the plurality of processors to a write-cache to cause the write-cache to obtain exclusive access to a control memory of the shared resource; transmitting a first signal to the front end of the processor indicating that the write-cache has obtained exclusive access to the control memory of the shared source; executing at least one next instruction; transmitting a second signal to the write cache indicating that execution of the at least one next instruction has been completed; and storing data from the write cache to the control memory of the shared resource in response to the second signal transmitted to the write cache.

In another aspect of the invention, the at least one next instruction includes a load instruction and a compare instruction, where the load instruction is executed before the compare instruction.

In yet another aspect of the invention, the second signal is indicative of whether a condition of the compare instruction has been satisfied, and the storing of data to the control memory takes place when the second signal indicates that the compare instruction has been satisfied.

In still a further aspect of the invention, the store, load and compare instructions constitute a compare and swap routine in which an identifier of the at least one processor is loaded into the control memory of the shared resource in the case where an identifier of another processor is not already loaded in the control memory of the shared resource.

In still a further aspect of the invention, the store instruction and the at least one next instruction are produced under control of a helper instruction unit functionally located at the front end of the processor.

In yet another aspect of the invention, each of the store instruction and the at least one next instruction are applied to a pipelined execution unit of the one of the plurality of processors.

BRIEF DESCRIPTION OF THE DRAWINGS

The above and other objects and advantages of the present invention will become readily apparent to those skilled in the art from the description that follows, with reference to the accompanying drawings, in which.

DETAILED DESCRIPTION OF THE PREFERRED EMBODIMENTS

As suggested above, atomics are comprised of three parts, i.e., load, compare and store. Each of these three parts can already be carried out using normal instructions in the machine. As described in detail below, a small change in semantics of these instructions allows a sequence of three "helpers" to be used in the normal data paths and functional units of the machine to provide the necessary operations for an atomic with minimal extra hardware.

RISC processors are generally equipped with a mechanism for executing what are referred to herein as "helper" instructions. Notwithstanding the fact that the RISC processor is generally characterized by a relatively simple instruction set, there often also exists a small handful of complex instructions in the processor's memory. Helper mechanisms function to convert such a complex instruction into two or three RISC-like special instructions, each of which carry out a small part of the complex instruction. A helper mechanism is placed at the front end of the processor to generate the helper instructions.

One aspect of the present invention resides in the execution of atomics using helper instructions. A load helper instruction that almost looks like a normal load is sent down the pipeline to execute the load part, a compare helper instruction that almost looks like a normal compare is sent down the pipeline to execute the compare part, and a store helper instruction that almost looks like a store is sent down the pipeline to execute the store part. These instructions flow like normal instructions, with the data cache, the store queue control and the comparator control viewing them as almost normal instructions and, other than for very small changes as described below, these devices do not behave any differently than when presented with normal instructions. The helper instructions are generated by the already equipped helper mechanism of the normal operating processors, and thus, the use of a special atomic unit is avoided.

Figure 1:
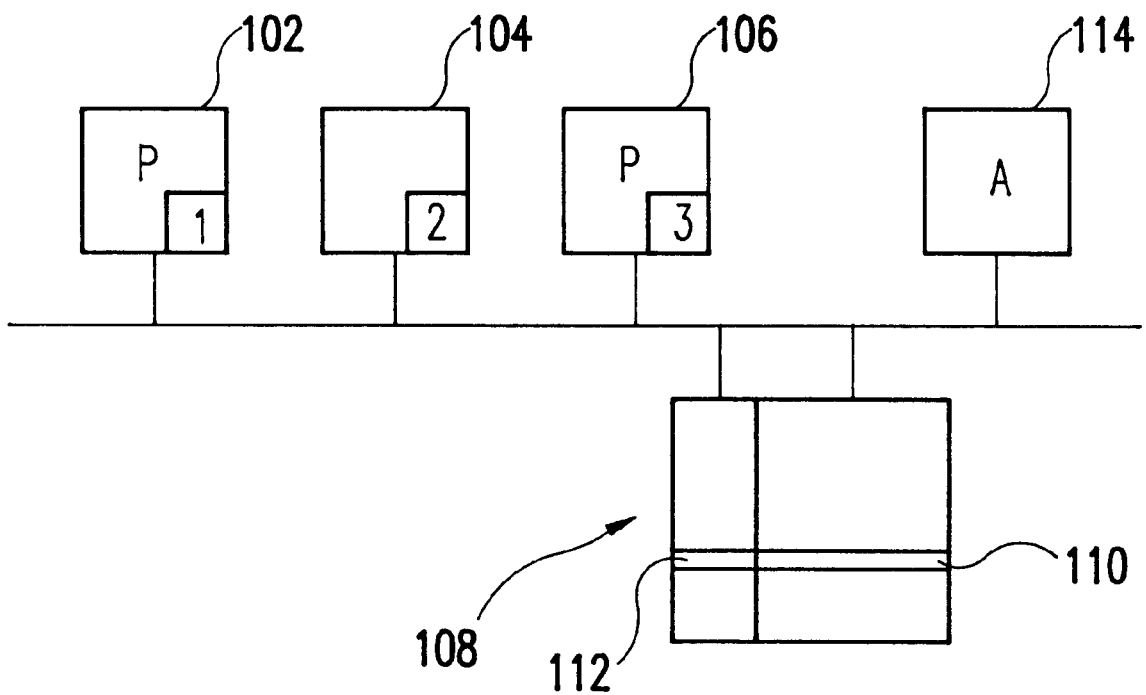
FIG. 1 is a block diagram of a conventional multiprocessor system having a separate and dedicated atomic processing unit.
Figure 2:
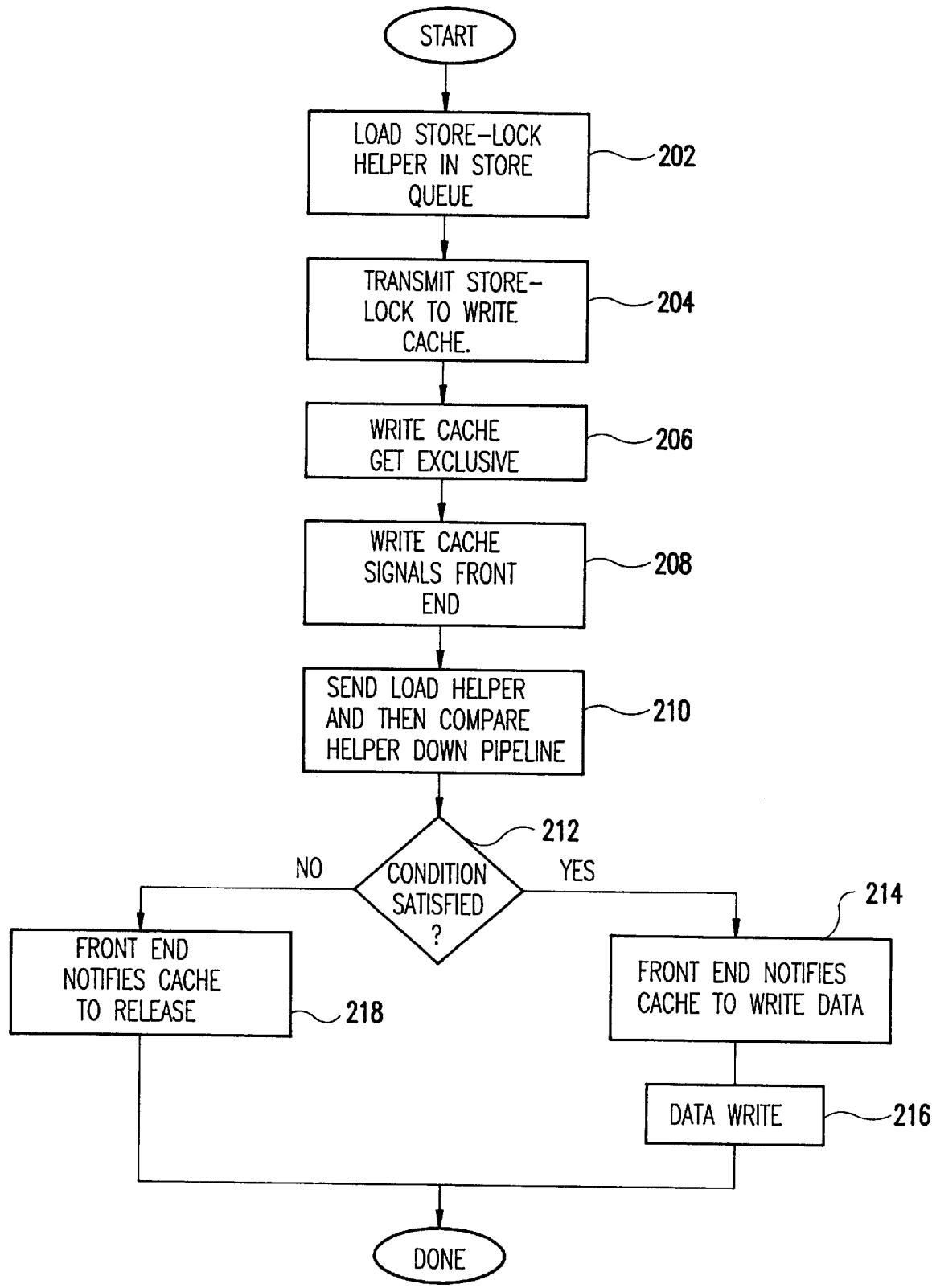
FIG. 2 is a flowchart for explaining a "compare and swap" atomic as it is executed according to the present invention.
Figure 3:
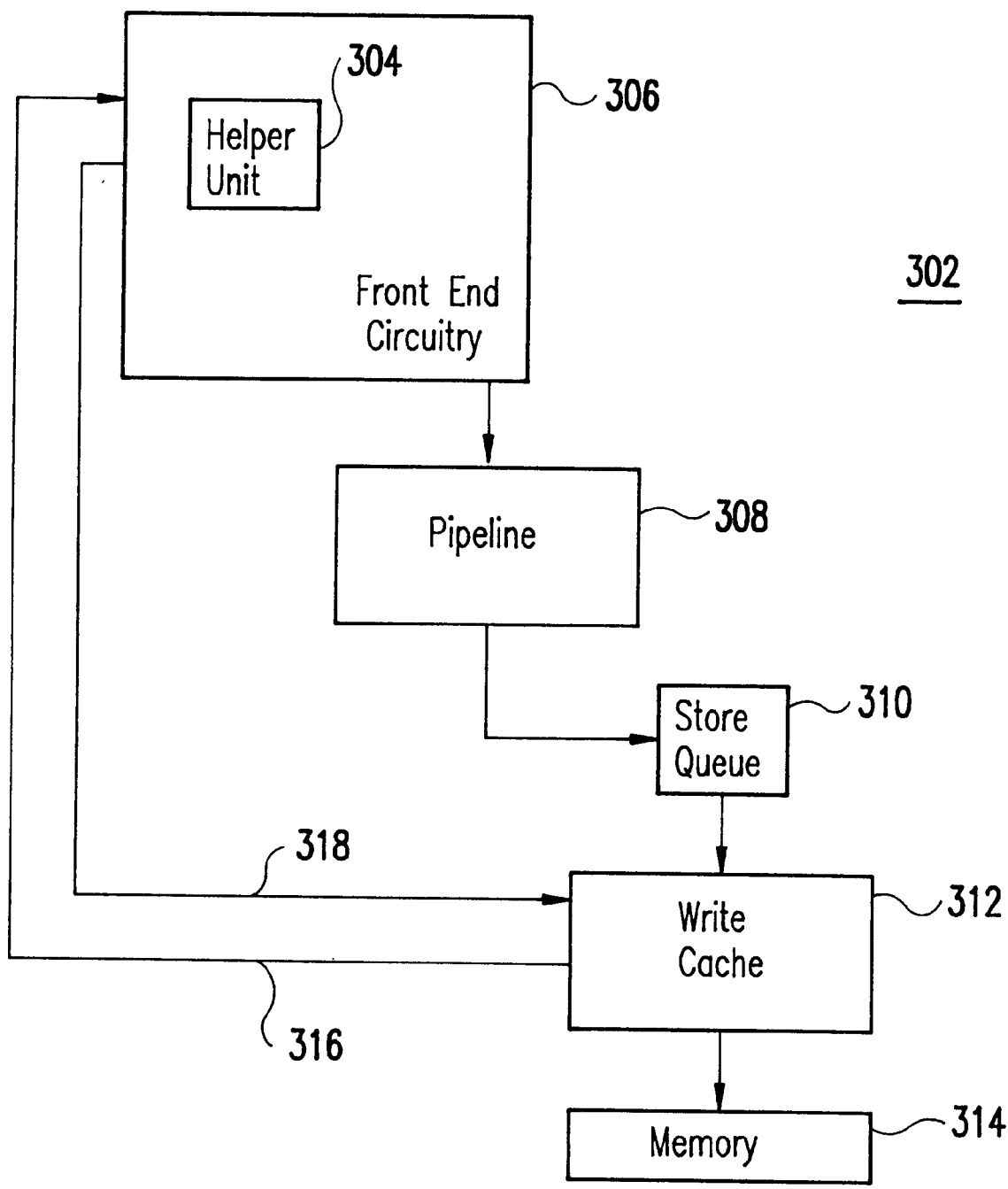
FIG. 3 is a block diagram illustrating the main component parts of a processor executing the "compare and swap" atomic described in FIG. 2.

In the invention, the atomic is in effect treated like a complex instruction which is expanded into its individual constituent operations and sent down the pipeline as a sequence. As explained below, with reference to the flowchart of FIG. 2 and the block diagram of FIG. 3., the sequence has all the attributes of an indivisible atomic. Also, in contrast to the execution order of the normal atomic, the helper instruction sequence of the present invention is transmitted in the order of store, load, compare.

Initially, a store helper instruction (referred to as a "store-lock" herein) is produced by the helper instruction unit 304 located at the front end circuitry 306 of the processor 302. The processor 302 is a normal general purpose operating processor which shares a memory 314 with other like processors. The store-lock is sent through the pipeline 308 circuitry like a normal store, and is then place in a store queue 310 (step 202).

Thus, the "store-lock" helper goes down the pipe 308 first and goes into the store queue 310 as all stores do. In order to make the instruction sequence atomic, there must be an assurance that all the older stores are done. In the invention, the store-lock goes into the store queue 310 in the normal fashion, and nothing else happens until it gets to the top of the queue 310, which guarantees that all the prior stores are done since they preceded the store-lock in the store queue 310. Up to this time, the store-lock behaves like any other store instruction.

From the store queue 310, the store-lock proceeds to the write-cache 312 (step 204), where the write-cache 312 identifies the store-lock as an atomic store. In one embodiment of the invention, the atomic helper instructions are identifiable by a special bit contained therein.

Responsive to the receipt of the store-lock, the write cache 312 gets exclusivity of the appropriate memory line just like it would for a normal store (step 206). However, the store-lock can not be stored like a normal store, since the load and compare functions of the atomic must be completed first. Instead, once exclusivity is established and the resource is no longer visible to the remaining processors, a notification mechanism of the write cache 312 signals the front end 306 via a signal line 316 (step 208).

The front end 306 is responsive to the signal on line 316 to send the load helper instruction down the pipeline 308, and to immediately thereafter send the compare helper instruction down the pipeline 308 (step 310). The load helper and the compare helper behave like any other pair of dependent instructions, with all the bypass paths in the ALUs of the pipeline 308 working normally.

As such, the load helper is executed like any other load instruction, and then the compare helper is executed. The compare helper is also executed normally, except that upon its completion, the front end 306 transmits a comparison outcome signal on line 318 to the write cache 312 to thereby inform the write cache 312 of the comparison results, i.e., to direct the write cache to write or not write. That is, all during execution of the load and compare helpers, the write cache has maintained its exclusive hold on the line of the shared resource. The write cache delays its write action, however, until receiving confirmation that the condition of the store has been satisfied. If the condition of the compare helper is satisfied ("yes" at step 212), the write cache 312 is responsive to the comparison outcome signal (step 214) to write the data (processor identifier number, for example) in the control memory of the shared resource (step 216). If the condition is not satisfied ("no" at step 212), the write cache 312 is responsive to the comparison outcome signal (step 218) to release the exclusive hold on the control memory of the shared resource. In either case, execution of the atomic is completed.

In the above, the atomic is of the load, compare, store variety (i.e., "compare and swap" routine). As mentioned previously, some atomics simply function to load and store. In this case, no comparison is executed and the load is not conditional. The write cache would therefor be signaled from the front end to proceed with the write upon completion of the load. This effectively eliminates steps 212 and 218 in the operational flowchart of FIG. 2.

The present invention is thus at least partially characterized in that it maximally uses the existing helper mechanisms by sending out three (or two) instructions that very closely resemble regular store, compare and load instructions (or regular store and load instructions). In this manner, a load-compare-store function (or a load-store function) can be executed atomically without the provision of a dedicated atomic unit.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A processor-implemented method of executing an atomic instruction in a multiprocessor system having a plurality of processors accessing a shared resource, comprising:

transferring a store instruction from a front-end of one of said plurality of processors to a write-cache to cause the write-cache to obtain exclusive access to a control memory of the shared resource;

transmitting a first signal to the front end of the processor indicating that the write-cache has obtained exclusive access to the control memory of the shared source;

executing at least one next instruction;

transmitting a second signal to the write cache indicating that execution of the at least one next instruction has been completed; and storing data from the write cache to the control memory of the shared resource in response to the second signal transmitted to the write cache.

2. A processor implemented method as claimed in claim 1, wherein said at least one next instruction includes a load instruction and a compare instruction, and wherein the load instruction is executed before the compare instruction.

3. A processor implemented method as claimed in claim 2, wherein the second signal is indicative of whether a condition of the compare instruction has been satisfied, and wherein storing of data to the control memory takes place when the second signal indicates that the compare instruction has been satisfied.

4. A processor implemented method as claimed in claim 3, wherein the store, load and compare instructions constitute a compare and swap routine in which an identifier of the at least one processor is loaded into the control memory of the shared resource in the case where an identifier of another processor is not already loaded in the control memory of the shared resource.

5. A processor implemented method as claimed in claim 4, wherein the store instruction, the load instruction, and the compare instruction are produced under control of a helper instruction unit functionally located at the front end of the processor.

6. A processor implemented method as claimed in claim 5, wherein each of the store instruction and the at least one next instruction are applied to a pipelined execution unit of the one of the plurality of processors.

7. A processor implemented method as claimed in claim 3, wherein the store instruction, the load instruction, and the compare instruction are produced under control of a helper instruction unit functionally located at the front end of the processor.

8. A processor implemented method as claimed in claim 7, wherein each of the store instruction and the at least one next instruction are applied to a pipelined execution unit of the one of the plurality of processors.

9. A processor implemented method as claimed in claim 2, wherein the store instruction, the load instruction, and the compare instruction are produced under control of a helper instruction unit functionally located at the front end of the processor.

10. A processor implemented method as claimed in claim 9, wherein each of the store instruction and the at least one next instruction are applied to a pipelined execution unit of the one of the plurality of processors.

11. A processor implemented method as claimed in claim 1, wherein the store instruction and the at least one next instruction are produced under control of a helper instruction unit functionally located at the front end of the processor.

12. A processor implemented method as claimed in claim 11, wherein each of the store instruction and the at least one next instruction are applied to a pipelined execution unit of the one of the plurality of processors.

* * * * *